(12) United States Patent
Huang et al.

(10) Patent No.: US 11,748,948 B2
(45) Date of Patent: Sep. 5, 2023

(54) MESH RECONSTRUCTION METHOD AND APPARATUS FOR TRANSPARENT OBJECT, COMPUTER DEVICE AND STORAGE MEDIUM

(71) Applicant: SHENZHEN UNIVERSITY, Guangdong (CN)

(72) Inventors: Hui Huang, Shenzhen (CN); Jiahui Lyu, Shenzhen (CN)

(73) Assignee: Shenzhen University, Guangdong (CN)

( * ) Notice: Subject to any disclaimer, the term of this patent is extended or adjusted under 35 U.S.C. 154(b) by 338 days.

(21) Appl. No.: 17/254,580

(22) PCT Filed: Oct. 12, 2020

(86) PCT No.: PCT/CN2020/120310
§ 371 (c)(1),
(2) Date: Dec. 21, 2020

(87) PCT Pub. No.: WO2022/077146
PCT Pub. Date: Apr. 21, 2022

(65) Prior Publication Data
US 2022/0319112 A1   Oct. 6, 2022

(51) Int. Cl.
*G06T 17/20* (2006.01)
*G06T 15/06* (2011.01)
*G06T 15/20* (2011.01)

(52) U.S. Cl.
CPC .............. *G06T 17/20* (2013.01); *G06T 15/06* (2013.01); *G06T 15/205* (2013.01)

(58) Field of Classification Search
CPC ....... G06T 17/00; G06T 17/20; G06T 17/205; G06T 5/50; G06T 5/55; G06T 5/564; G06T 5/596; G06T 5/75
See application file for complete search history.

(56) References Cited

U.S. PATENT DOCUMENTS

2003/0063086 A1* 4/2003 Baumberg ............ G06T 17/205
345/420
2011/0093243 A1* 4/2011 Tawhai ................. G06T 7/0012
703/2

FOREIGN PATENT DOCUMENTS

CN  107240148 A  10/2017
CN  109118531 A   1/2019
(Continued)

OTHER PUBLICATIONS

Wu, Bojian, et al. "Full 3D reconstruction of transparent objects." arXiv preprint arXiv:1805.03482 (2018). (Year: 2018).*
(Continued)

*Primary Examiner* — Ryan McCulley
(74) *Attorney, Agent, or Firm* — Polsinelli PC

(57) ABSTRACT

Disclosed are a mesh reconstruction method and apparatus for a transparent object, a computer device and a storage medium. The method includes: acquiring object images of the transparent object at multiple capture view angles and calibration information corresponding to an image capture device, the image capture device configured to capture being the object images; generating an initial mesh model corresponding to the transparent object according to the object images acquired at the multiple capture view angles; determining a light ray refraction loss corresponding to an emergent light ray of the image capture device according to the calibration information, and determining a model loss corresponding to the initial mesh model according to the light ray refraction loss; and reconstructing the initial mesh model according to the model loss, to obtain a target mesh model corresponding to the transparent object.

10 Claims, 6 Drawing Sheets

(56) References Cited

FOREIGN PATENT DOCUMENTS

| CN | 110689514 A | 1/2020 |
| CN | 111127633 A | 5/2020 |
| CN | 111428815 A | 7/2020 |
| CN | 111709270 A | 9/2020 |

OTHER PUBLICATIONS

Bojian, "Image-based Modeling and Rendering of Transparent Objects", A dissertation submitted to the University of Chinese Academy of Sciences in partial fulfillment of the requirement for the degree of Doctor of Philosophy in Computer Science, Shenzhen Institutes of Advanced Technology Chinese Academy of Sciences, Dec. 2019 (126 pages).

PCT/ISA/210 International Search Report dated Jul. 8, 2021 issued in corresponding Parent Patent Application No. PCT/CN2020/120310 (4 pages).

\* cited by examiner

MESH RECONSTRUCTION METHOD AND APPARATUS FOR TRANSPARENT OBJECT, COMPUTER DEVICE AND STORAGE MEDIUM

CROSS REFERENCE TO RELATED APPLICATIONS

This application is a National Phase of International Application No. PCT/CN2020/120310, filed on Oct. 12, 2020, entitled "MESH RECONSTRUCTION METHOD AND APPARATUS FOR TRANSPARENT OBJECT, COMPUTER DEVICE AND STORAGE MEDIUM", the contents of which are expressly incorporated by reference herein in its entirety.

TECHNICAL FIELD

The present disclosure relates to a mesh reconstruction method and apparatus for a transparent object, a computer device and a storage medium.

BACKGROUND

A mesh reconstruction refers to establishing a mesh model of a three-dimensional object suitable for computer representation and processing, which is a basis for processing, operating and analyzing properties thereof in a computer environment, and is also a key technology to establish a virtual reality expressing the objective world in the computer.

A mesh reconstruction process in a conventional mode is usually for non-transparent objects, and corresponding mesh models are established by scanning the non-transparent objects. However, the conventional mode for the non-transparent objects cannot be applied to transparent objects; and a mesh model of a transparent object established by the conventional mode for transparent objects is easy to lose details of the transparent object, resulting in lower accuracy of the mesh reconstruction of the transparent object.

SUMMARY

Embodiments of the present disclosure provide a mesh reconstruction method and apparatus for a transparent object, a computer device and a storage medium.

A mesh reconstruction method for a transparent object includes:

acquiring object images of the transparent object at multiple capture view angles and calibration information corresponding to an image capture device, the image capture device being configured to capture the object images;

generating an initial mesh model corresponding to the transparent object according to the object images acquired at the multiple capture view angles;

determining a light ray refraction loss corresponding to an emergent light ray of the image capture device according to the calibration information, and determining a model loss corresponding to the initial mesh model according to the light ray refraction loss; and reconstructing the initial mesh model according to the model loss, to obtain a target mesh model corresponding to the transparent object.

A mesh reconstruction apparatus for a transparent object includes:

an image acquisition module, configured to acquire object images of the transparent object at multiple capture view angles and calibration information corresponding to an image capture device, the image capture device being configured to capture the object images;

a model generation module, configured to generate an initial mesh model corresponding to the transparent object according to the object images acquired at the multiple capture view angles;

a loss determination module, configured to determine a light ray refraction loss corresponding to an emergent light ray of the image capture device according to the calibration information, and determine a model loss corresponding to the initial mesh model according to the light ray refraction loss; and a mesh reconstruction module, configured to reconstruct the initial mesh model according to the model loss, to obtain a target mesh model corresponding to the transparent object.

A computer device includes one or more processors and a memory storing computer-readable instructions, and one or more processors, when executing the computer-readable instructions, perform the steps of the mesh reconstruction method for the transparent object provided by any one of the above-mentioned embodiments.

One or more non-transitory computer-readable storage media store computer-readable instructions, and one or more processors, when executing the computer-readable instructions, perform the steps of the mesh reconstruction method for the transparent object provided by any one of the above-mentioned embodiments.

Details of one or more embodiments of the present disclosure are set forth in the following drawings and description. Other features and advantages of the present disclosure will become apparent from the description, accompanying drawings and claims.

BRIEF DESCRIPTION OF THE DRAWINGS

In order to illustrate the technical solutions of the embodiments of the present disclosure clearer, drawings needed to be used in the embodiments will be briefly introduced below. Obviously, the drawings in the following description are merely some embodiments of the present disclosure; and those of ordinary skill in the art can obtain other drawings based on these drawings without creative work.

DETAILED DESCRIPTION

In order to make the technical solution and advantages of the present disclosure clearer, the present disclosure will be further detailed with reference to the accompanying drawings and embodiments. It should be appreciated that specific embodiments described here are merely used for explaining the present disclosure, rather than limiting the present disclosure.

Figure 1:
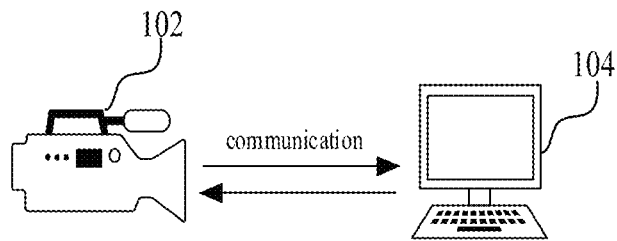
FIG. 1 is an application environment diagram of a mesh reconstruction method for a transparent object according to one or more embodiments.

The mesh reconstruction method for a transparent object provided by the present disclosure can be applied to the application environment as shown in FIG. 1. An image capture device 102 establishes a connection and communicates with a terminal 104 in a wired or wireless mode. The image capture device 102 captures object images of the transparent object from multiple capture view angles. The terminal 104 acquires the object images of the transparent object captured by the image capture device 102 at multiple capture view angles, and calibration information corresponding to the image capture device 102. The terminal 104 generates an initial mesh model corresponding to the transparent object according to the object images at multiple capture view angles. The terminal 104 determines a light ray refraction loss corresponding to an emergent light ray of the image capture device according to the calibration information, and determines a model loss corresponding to the initial mesh model according to the light ray refraction loss. The terminal 104 reconstructs the initial mesh model according to the model loss, to obtain a target mesh model corresponding to the transparent object. The image capture device 102 can include, but is not limited to, various types of cameras, video cameras, photographic cameras, or other devices having a function of image capture. The terminal 104 can be, but is not limited to, various personal computers, notebook computers, smart phones, tablet computers, and portable wearable device.

Figure 2:
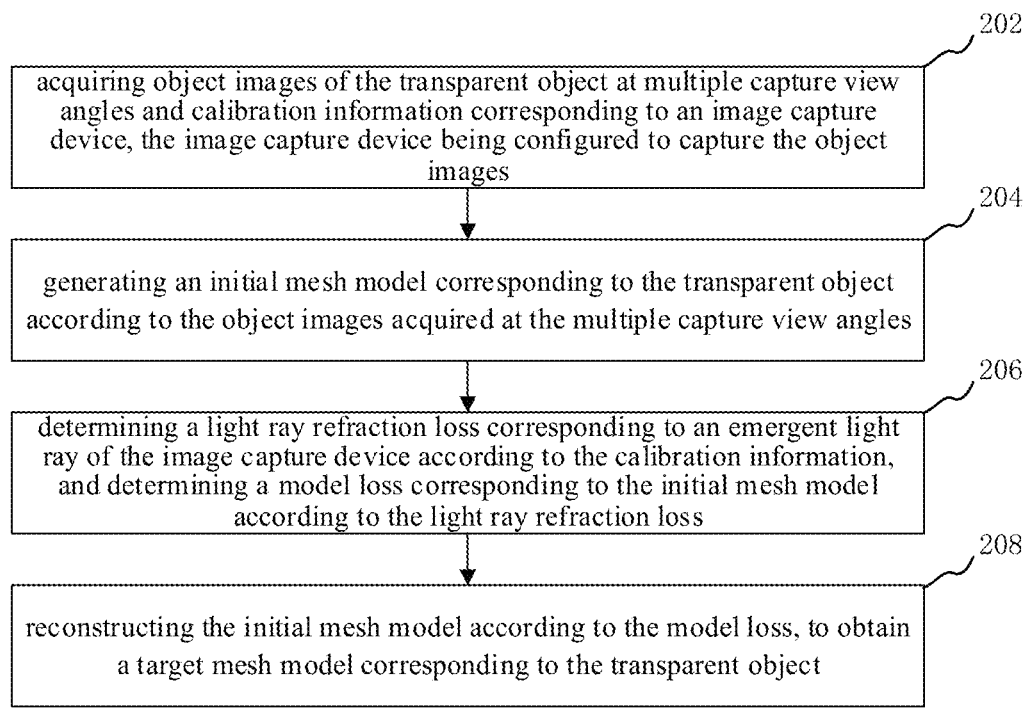
FIG. 2 is a flow chart of a mesh reconstruction method for a transparent object according to one or more embodiments.

In some embodiments, as shown in FIG. 2, a mesh reconstruction method for a transparent object is provided, which is applied to the terminal 104 in FIG. 1 as an example to illustrate, and the method includes the following steps.

Step 202: object images of the transparent object at multiple capture view angles, and calibration information corresponding to an image capture device are acquired; the image capture device is configured to capture the object images.

A transparent object refers to a three-dimensional object that light rays can pass through. The transparent object is a target object of the mesh reconstruction. A target mesh model corresponding to the transparent object is obtained through the mesh reconstruction. The terminal can acquire object images of the transparent object at multiple capture view angles, and the calibration information corresponding to the image capture device. The image capture device can be a device having a function of image capture, and is configured to capture object images corresponding to the transparent object. The terminal can establish a connection and communicate with the image capture device in a wired connection or a wireless connection mode, and the terminal can acquire the object images corresponding to the transparent object captured by the image capture device through the connection established with the image capture device.

The object images captured by the image capture device include object images of the transparent object at multiple capture view angles. The capture view angle refers to an angle between the image capture device and a front of the transparent object when the object images of the transparent object are captured. The terminal can acquire multiple object images of the transparent object at multiple capture view angles. The object images at multiple capture view angles can respectively reflect the transparent object from each angle. Specifically, object images of the transparent object at multiple capture view angles can be captured by a mobile image capture device. According to a positional relationship between the transparent object and the image capture device, correspondingly, the object images corresponding to the multiple capture view angles can be captured by rotating the transparent object in the case of a fixed image capture device. For example, in the case of the fixed image capture device, the transparent object rotates horizontally to the left by 10 degrees each time, and the object images of the transparent object at multiple capture view angles are acquired through multiple rotations.

The terminal can also acquire calibration information corresponding to the image capture device. The calibration information can include at least one of internal calibration information or external calibration information corresponding to the image capture device. The calibration information can be configured to accurately reflect a device parameter corresponding to the image capture device. The calibration information can specifically include, but is not limited to, at least one of position information, a capture view angle, an image pixel, a focal length corresponding to the image capture device, or a distance between the image capture device and the transparent object. The terminal can acquire the corresponding calibration information from the image capture device, and can also determine the calibration information corresponding to the image capture device in response to a received configuration operation. The configuration operation can specifically be a calibration information input operation of a user, so as to obtain the calibration information inputted by the user.

Figure 3:
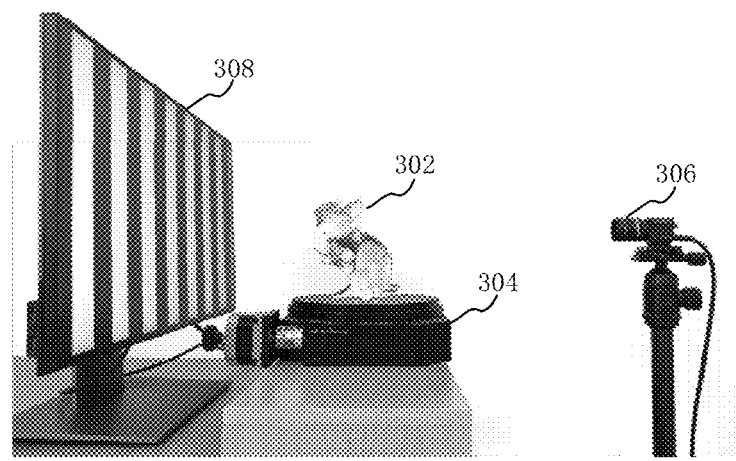
FIG. 3 is an application environment diagram of a mesh reconstruction method for a transparent object according to another embodiment.

As shown in FIG. 3, which is an application environment diagram of a mesh reconstruction method for a transparent object in an embodiment. FIG. 3 shows a transparent object 302, a rotary table 304, an image capture device 306, and a background screen 308. The transparent object 302 is specifically a rabbit-shaped transparent object, or may be a transparent object in other shapes in other embodiments. The transparent object 302 can be placed on the rotary table 304, and is driven to rotate by the rotary table 304. The image capture device 306 can specifically be a camera, and can use the background screen 308 as a background of the transparent object 302 to capture object images corresponding to the transparent object 302. The background screen 308 can specifically display an image with black and white stripes, so as to determine a corresponding relationship between emergent light rays of the image capture device 306 and each pixel point of a background image.

The terminal can acquire calibration information corresponding to the image capture device 306. The calibration information can specifically include a parameter corresponding to the image capture device 306, a distance between the image capture device 306 and the transparent object 302, and a distance between the image capture device 306 and the background screen 308, and the like. The rotary table 304 can rotate to make the image capture device 306 capture object images of the transparent object 302 at multiple capture view angles. For example, the rotary table 304 can rotate five degrees each time, and rotate seventy-two times in all, then the image capture device 306 can capture seventy-two object images at different capture view angles.

The rotary table 304 can also rotate at a preset speed, for example, rotate one degree per second at a constant speed, and the image capture device 306 captures object images according to a preset frequency corresponding to the preset speed, for example, captures one object image corresponding to the transparent object every five seconds.

In some embodiments, the image capture device can capture the object images corresponding to the transparent object in a dark environment, thereby avoiding influence of ambient light rays on the mesh reconstruction, and improving an accuracy of the mesh reconstruction of the transparent object.

Step 204: an initial mesh model corresponding to the transparent object is generated according to the object images acquired at the multiple capture view angles.

The terminal can generate an initial mesh model corresponding to the transparent object according to the acquired object images at multiple capture view angles. The initial mesh model refers to a mesh model corresponding to a transparent object that has not been reconstructed; and the initial mesh model can be a mesh model to be reconstructed. A mesh model refers to a three-dimensional model in which an object is represented by polygons in the form of a mesh. The mesh can specifically be a triangle, a quadrilateral, or other convex polygons.

Specifically, the terminal can determine object contours of the transparent object corresponding to various capture view angles according to the acquired object images at multiple capture view angles. An object contour can be a line of an outer edge of the transparent object at a corresponding capture view angle. The object contour is two-dimensional data. An object image at each capture view angle can respectively correspond to an object contour of the transparent object. The terminal can generate a three-dimensional convex hull corresponding to the transparent object according to multiple object contours corresponding to the transparent object; and the three-dimensional convex hull can specifically be a visual convex polygon which can embrace the transparent object. A mode for generating the three-dimensional convex hull can specifically include, but is not limited to, combination of multiple object contours according to a positional relationship among the multiple object contours to obtain the three-dimensional convex hull corresponding to the transparent object. A positional relationship refers to an angular relationship among multiple object contours which is determined according to the transparent object. For example, an object contour obtained from a front view angle of the transparent object is 90 degrees from an object contour obtained from a left view angle of the transparent object. The terminal can mesh the generated three-dimensional convex hull to obtain an initial mesh model represented by the visual convex hull.

Step 206: a light ray refraction loss corresponding to an emergent light ray of the image capture device is determined according to calibration information; and a model loss corresponding to the initial mesh model is determined according to the light ray refraction loss.

The emergent light ray refers to a light ray emitted by the image capture device. The light ray refraction loss can be configured to represent a degree of difference between a simulated light ray refraction and an actual light ray refraction of the emergent light ray of the image capture device. The model loss can be configured to represent a degree of difference between the initial mesh model and an accurate mesh model corresponding to the transparent object. The loss has a positive correlation with the corresponding degree of difference; and the greater the loss, the greater the corresponding degree of difference.

It can be appreciated that according to the imaging principle of the image capture device, the image capture device can emit multiple light rays, and each light ray passes through the transparent object and is refracted to a background in the object image, such as the background screen 308 in FIG. 3. A content of each pixel in the object image, for example, a color corresponding to a pixel, is derived from a corresponding area in the background.

In some embodiments, the background screen can use an image including horizontal and vertical black and white stripes as a background to capture the object images of the transparent object, so as to more quickly and accurately determine a corresponding relationship between the pixel in the object image and the background area, and then to determine a corresponding relationship between each of the multiple emergent light rays and the background area on a basis of the corresponding relationship between the emergent light ray of the image capture device and the pixel. In order to facilitate the understanding, it can be considered that after being refracted by the transparent object, the emergent light ray can fall on the background screen to obtain a corresponding position of the emergent light ray on the background screen. Each emergent light ray can have its own corresponding position.

The transparent object is an object through which the emergent light ray can pass. When entering the transparent object and leaving the transparent object, the emergent light ray is refracted through a surface of the transparent object. An angle of the refraction is related to an angle between the emergent light ray and the surface of the transparent object. Since the shape of the initial mesh model is not exactly the same as the shape of the actual transparent object, when the same emergent light ray respectively passes through the initial mesh model and the transparent object, an optical path obtained by each refraction is also different, and refraction results of the light ray can specifically be expressed as different corresponding positions on the background screen.

The terminal can track multiple emergent light rays emitted from the image capture device, and obtain an actual refraction result of each emergent light ray passing through the transparent object according to a corresponding relationship between each of the multiple emergent light rays and a pixel of the object image, and determine a model refraction result of each emergent light ray passing through the initial mesh model according to the generated initial mesh model D. The terminal can determine the light ray refraction loss corresponding to the initial mesh model according to a difference between the actual refraction result and the model refraction result of each emergent light ray, and determine the model loss corresponding to the initial mesh model according to the light ray refraction loss.

Specifically, the terminal can determine the number of emergent light rays emitted by the image capture device and an emergent angle corresponding to each emergent light ray according to the calibration information corresponding to the image capture device, and determine a corresponding relationship between the emergent light ray and the background position according to the corresponding relationship between the emergent light ray and each pixel in the object image, to obtain an actual background position corresponding to each emergent light ray. The terminal can determine a simulated background position of the emergent light ray obtained by refraction through the initial mesh model according to the calibration information corresponding to the image capture device and based on the principle of light refraction. The terminal can synthesize a difference between an actual background position and a simulated background position corresponding to each of multiple emergent rays, to obtain the light ray refraction loss corresponding to the initial mesh model.

In some embodiments, the mode for synthesizing the difference between the actual background position and the simulated background position can specifically include a synthesis of a position distance between the actual background position and the simulated background position. The terminal can calculate a corresponding position distance according to the actual background position and the simulated background position, and perform a synthetic operation on position distances respectively corresponding to the multiple emergent light rays to obtain the light ray refraction loss. The synthetic operation can specifically be a summation operation.

The terminal can directly determine the obtained light ray refraction loss as the model loss corresponding to the initial mesh model; or the terminal can process the light ray refraction loss, and determine the processed loss as the model loss corresponding to the initial mesh model. For example, the terminal can acquire a light ray refraction weight corresponding to the light ray refraction loss, and calculate the light ray refraction loss according to the light ray refraction weight to obtain the model loss corresponding to the initial mesh model. The light ray refraction weight can be set according to actual application requirements, or can be obtained by learning in the model reconstruction process. The operation mode of the light ray refraction weight and the light ray refraction loss can specifically be a product operation. The terminal can also acquire other losses corresponding to the initial mesh model, and obtain the model loss corresponding to the initial mesh model by synthesizing the light ray refraction loss and other losses.

Step 208: the initial mesh model is reconstructed according to the model loss, to obtain a target mesh model corresponding to the transparent object.

The target mesh model refers to a mesh model obtained after reconstructing the initial mesh model. The target mesh model can more accurately represent the corresponding transparent object. Specifically, the terminal can adjust, according to the model loss corresponding to the initial mesh model, each mesh vertex in the initial mesh model along a direction in which the model loss is made to decrease, and reconstruct the initial mesh model in a mode of gradient descent until the model converges, and obtain the target mesh model corresponding to the transparent object.

For example, it is supposed that the model loss is specifically the light ray refraction loss corresponding to the emergent light and the mesh shape of the initial mesh model is triangular, and when an emergent light ray passes through the transparent object, the emergent light ray can pass through two triangular meshes corresponding to the initial mesh model, that is, the two triangular meshes in the initial mesh model can refract the emergent light ray. Accordingly, the terminal can adjust six mesh vertices corresponding to the two triangular meshes through which the emergent light ray passes along the direction in which the light ray refraction loss corresponding to the emergent light ray is decreased, such that the adjusted mesh model can be more accurately represented the transparent object. The terminal can adjust a mesh vertex corresponding to each emergent light ray respectively according to the light ray refraction loss corresponding to the multiple emergent light rays, and obtain the reconstructed target mesh model.

In some embodiments, the above-mentioned mesh reconstruction method for a transparent object can also be applied to a server, and the server can specifically be an independent server or a server cluster including two or more servers. The image capture device can upload the captured object images to the server, or upload object images to the server after the terminal obtains the object images of the transparent object at multiple capture view angles. The server can perform mesh reconstruction on the transparent object according to the steps of the above-mentioned mesh reconstruction method for the transparent object, and obtain a target mesh model corresponding to the transparent object, thereby effectively saving local operating resources of the terminal.

In the embodiment, by acquiring the object images of the transparent object from multiple capture view angles and the calibration information corresponding to the image capture device, the initial mesh model corresponding to the transparent object is generated according to the object images acquired at the multiple capture view angles; the light ray refraction loss corresponding to the emergent light ray of the image capture device is determined by means of the calibration information; and the model loss corresponding to the initial mesh model is determined according to the light ray refraction loss; and then the initial mesh model is reconstructed according to the model loss, and the target mesh model corresponding to the transparent object is obtained. By directly generating the initial mesh model and reconstructing the initial mesh model, a large amount of training data is not required compared to the conventional mode, thereby reducing the amount of data needed to be collected and the reconstruction time. By determining the model loss of the initial mesh model according to the light ray refraction loss, the light ray refraction relationship of the emergent light ray is fully utilized, and the model mesh is optimized directly according to the model loss, which effectively improves the accuracy of the mesh reconstruction for the transparent object.

In some embodiments, the step of generating the initial mesh model corresponding to the transparent object according to the object images acquired at the multiple capture view angles includes: a plurality of contour images corresponding to the transparent object are extracted from the object images acquired at the multiple capture view angles; space carving is performed according to the plurality of contour images to obtain a three-dimensional convex hull corresponding to the transparent object; a target mesh parameter is acquired, and the three-dimensional convex hull is meshed according to the target mesh parameter to obtain the initial mesh model corresponding to the transparent object.

A contour image refers to an image corresponding to an object contour of the transparent object, which can be configured to accurately represent the object contour corresponding to the transparent object. For example, the contour image can specifically be a silhouette mask corresponding to the transparent object. The terminal can extract the contour image of the transparent object respectively corresponding to each capture view angle from the object images acquired at the multiple capture view angles. Specifically, since the transparent object can refract the emergent light ray, that is, in the object image corresponding to the transparent object, the partial background image corresponding to the transparent object may be distorted, the terminal can extract the distorted partial image from the object image and determine the distorted partial image as the contour image of the transparent object at a corresponding capture view angle, and accordingly extract the contour images of the transparent object corresponding to the multiple capture view angles.

The terminal can use a space carving technology to perform space carving according to the extracted a plurality of contour images to obtain the three-dimensional convex hull corresponding to the transparent object. Specifically, the terminal can determine a frustum at a corresponding capture view angle according to the calibration information corresponding to the image capture device including, for example, a position corresponding to the image capture device, a distance between the image capture device and the transparent object, or a distance between the image capture device and the background screen, and on a basis of the contour images. The frustum can be configured to represent a visible frustum range of the image capture device corresponding to a contour image; and each capture view angle can have its own corresponding frustum. The terminal can calculate an intersection of multiple frustums respectively corresponding to the multiple capture view angles, and determine the three-dimensional convex hull corresponding to the transparent object according to the intersection of the multiple frustums.

Figure 4:
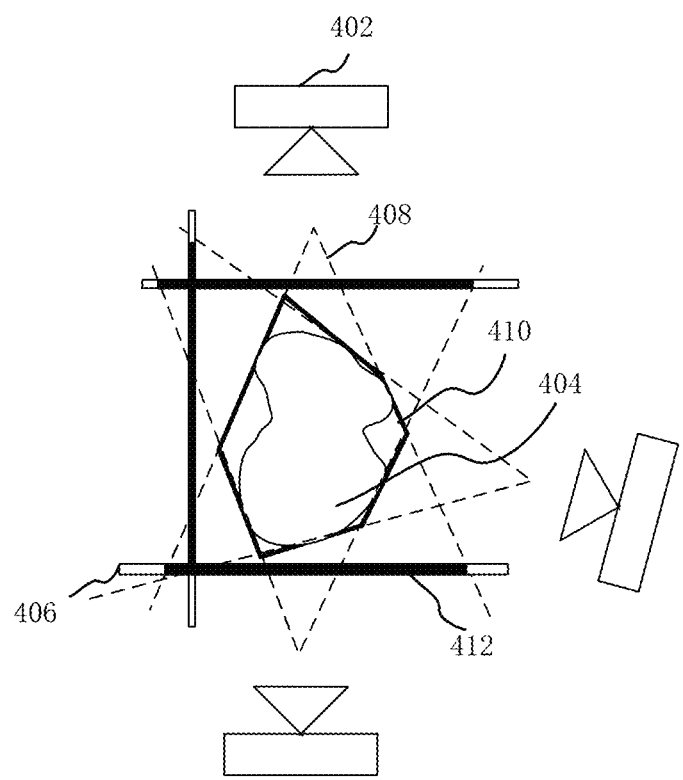
FIG. 4 is a schematic diagram of a three-dimensional convex hull corresponding to a transparent object according to one or more embodiments.

For example, as shown in FIG. 4, which is a schematic diagram of a three-dimensional convex hull corresponding to a transparent object in an embodiment. It can be understood that, for the convenience of illustration, two-dimensional data is used for display and description in FIG. 4; and in the actual application process, it may specifically be three-dimensional data corresponding to the transparent object. Multiple image capture devices 402 in FIG. 4 can indicate that corresponding object images are captured at multiple capture view angles, while the multiple image capture devices are not necessarily required. As shown in FIG. 4, the image capture device 402 can capture object images corresponding to the transparent object 404 at multiple capture view angles, in which the background screen 406 can be used as the background of the transparent object. A portion of the background screen 406 corresponding to the transparent object 404 can be distorted by the transparent object 404, and an image corresponding to the distorted portion is a contour image 412 in the object image. A frustum 408 of the image capture device 402 corresponding to each capture view angle can be represented in the form of a dotted line. As shown in FIG. 4, the terminal can determine the three-dimensional convex hull 410 corresponding to the transparent object 404 according to an intersection area of multiple frustums 408. A range of the three-dimensional convex hull 410 can embrace the transparent object 404.

The terminal can obtain the target mesh parameter, and perform meshing process according to the target mesh parameter. The target mesh parameter refers to a mesh parameter for meshing process, and may specifically be a side length corresponding to a side of the mesh. For example, when the mesh is specifically triangular, the mesh parameter can be a value or a value range of a side length of the triangle. The mesh parameter can be determined according to actual application requirements, and the mesh parameter can be changed according to actual requirements during the model reconstruction process. The terminal can mesh the three-dimensional convex hull according to the target mesh parameter, accordingly the three-dimensional convex hull is partitioned into meshes corresponding to target mesh parameters and an initial mesh model corresponding to the transparent object is obtained.

In some embodiments, the terminal can repeatedly acquire mesh parameters multiple times to perform the reconstruction; the multiple times may refer to twice or more than twice. The target mesh parameter can be negatively correlated with the repetitions. The more the repetitions, the smaller the corresponding target mesh parameter. As a result, in the process of the model reconstruction, meshes of the mesh model are gradually reduced, thereby effectively improving the accuracy of the target mesh model obtained through the reconstruction.

In the embodiment, a plurality of contour images corresponding to the transparent object are extracted and space carving is performed according to the plurality of contour images to obtain the three-dimensional convex hull corresponding to the transparent object, and the three-dimensional convex hull is meshed according to the acquired target mesh parameter to obtain the initial mesh model corresponding to the transparent object, thereby reducing the amount of data required for generating the mesh model and the mesh reconstruction, reducing time spent on data processing and model optimization, effectively improving the efficiency of mesh reconstruction and saving resources required for the mesh reconstruction.

In some embodiments, after the step of reconstructing the initial mesh model according to the model loss, the above method further includes steps of: returning to the step of acquiring the target mesh parameter; meshing, according to the acquired target mesh parameter, a mesh model obtained by the reconstructing; and recording the first number of returns; when the first number of returns reaches a first threshold, stopping returning to the step of acquiring the target mesh parameter.

After the initial mesh model is reconstructed according to the model loss, the terminal can return to the step of acquiring the target mesh parameter, and repeatedly mesh the mesh model obtained by the reconstructing according to the acquired target mesh parameter, and record the number of returns; the terminal can determine the number of returns for repeatedly meshing as the first number of returns. The terminal can determine whether to continue to repeat the meshing process according to the recorded first number of returns. Specifically, the terminal can compare the first number of returns with the first threshold, and detect whether the first number of returns reaches the first threshold. The first threshold can be a threshold of times set according to actual application requirements, for example, which may be specifically set to 10 times. When the first number of returns reaches the first threshold, that is, when the first number of returns is greater than or equal to the first threshold, the terminal can stop returning to the step of acquiring the target mesh parameter and obtain the reconstructed target mesh model. The terminal repeatedly determines the model loss corresponding to the mesh model after the meshing process, and reconstructs the mesh model after the meshing process according to the model loss, thereby optimizing the generated initial mesh model to obtain a more accurate target mesh model.

In some embodiments, the target mesh parameter can be determined according to the first number of returns. The target mesh parameter can have a negative correlation with the first number of returns. The greater the first number of returns, the smaller the target mesh parameter. That is, by repeating the meshing process multiple times, meshes are gradually reduced, so as to implement the optimization and reconstruction processes of the mesh model from sparsity to precision. Specifically, the terminal can calculate a target mesh parameter corresponding to the first number of returns according to a corresponding relationship between the target mesh parameter and the first number of returns. The corresponding relationship between the target mesh parameter and the first number of returns can be determined according to actual application requirements.

In some embodiments, the calculation of the target mesh parameter according to the first number of returns can be specifically expressed as:

$$t_l = \frac{L \cdot t_{min}}{l}, (l = 1,2,3...L)$$

where, l represents the first number of returns, L represents the first threshold, and the first number of returns can be an integer between 1 and the first threshold. When satisfying l=L, which means that the first number of returns reaches the first threshold, and then stop returning to acquire the target mesh parameter; $t_l$ represents the target mesh parameter corresponding to the first number of returns; $t_{min}$ represents a mesh parameter change distance which can be configured to constrain a degree of change on a surface of the mesh model during each meshing process. The mesh parameter change distance can be determined according to actual application requirements, for example, can be determined according to a diagonal length of the transparent object, such as 0.005*diagonal length. When the transparent object is irregular, the diagonal length can be a diagonal length of a bounding box of the transparent object. The terminal can re-mesh the mesh model according to the acquired target mesh parameter, and merge meshes with side lengths less than the target mesh parameter, or partition a mesh with a side length greater than the target mesh parameter, thereby making a side length of a mesh in the mesh model is approach to the target mesh parameter.

In some embodiments, after reconstructing the initial mesh model according to the model loss, the terminal can also return to the step of determining the light ray refraction loss corresponding to the emergent light ray of the image capture device according to the calibration information, and record the second number of returns. The terminal can repeatedly determine the light ray refraction loss corresponding to the emergent light ray of the image capture device according to the calibration information, and determine the model loss corresponding to the mesh model according to the light ray refraction loss, thereby repeatedly performing gradient descent according to the model loss and adjusting the mesh vertices of the mesh model. When the second number of returns reaches a second threshold, stop returning to the step of determining the light ray refraction loss corresponding to the emergent light ray of the image capture device according to the calibration information. The second threshold can be determined according to actual application requirements, for example, the second threshold may be specifically determined as 500 times. After adjusting the mesh vertices, the terminal repeatedly determines the model loss of the mesh model, and cycles the gradient descent to optimize the reconstructed mesh model and obtain the target mesh model corresponding to the transparent object.

Figure 5:
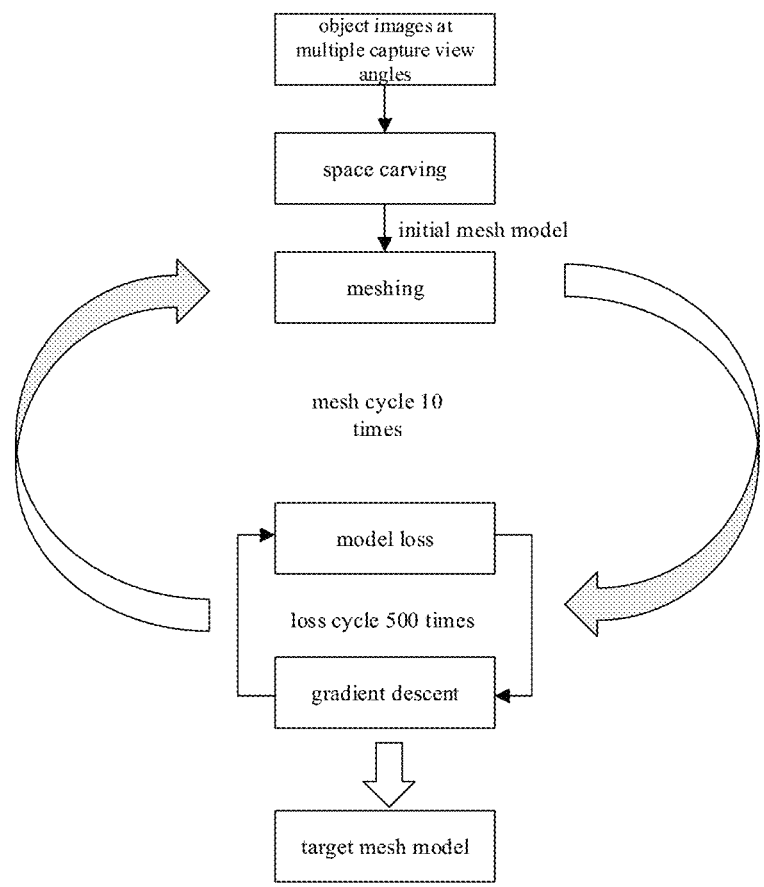
FIG. 5 is a schematic logic diagram of a model optimization according to one or more embodiments.

In some embodiments, the terminal can combine the first number of returns with the second number of returns, and repeat the determination of the model loss and the adjustment of the mesh vertices for the second number of returns each time the target mesh parameter is repeatedly acquired to perform the meshing processing. Accordingly, it is possible to continuously optimize positions of the mesh vertices and refine the mesh model so as to obtain a more accurate target mesh model. For example, as shown in FIG. 5, which is a schematic logic diagram of model optimization in an embodiment. In FIG. 5, the first threshold corresponding to the first number of returns is specifically 10 times, and the second threshold corresponding to the second number of returns is specifically 500 times. Each time the terminal performs a mesh cycle, 500 loss cycles are performed, that is, a total of 10 mesh cycles and 5000 loss cycles are performed to reconstruct the mesh model and obtain the target mesh model. The terminal optimizes meshes in the mesh model through every 500 loss cycles, such that the position of the vertex of each mesh is more accurate, and the meshes in the mesh model are made finer through 10 mesh cycles, thereby reconstructing to obtain the target mesh model corresponding to the transparent object, and effectively improving the accuracy of mesh reconstruction.

Figure 6:
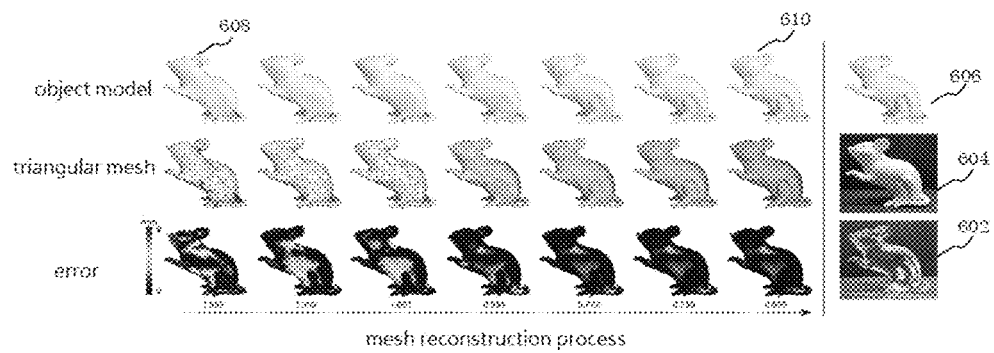
FIG. 6 is a schematic result diagram of a mesh reconstruction according to one or more embodiments.

In some embodiments, as shown in FIG. 6, which is a schematic result diagram of a mesh reconstruction in an embodiment. In FIG. 6, the transparent object 602 is specifically a rabbit-shaped transparent object. After the transparent object 602 is white-coated in a conventional manner, a white object 604 can be obtained, and a corresponding real model 606 can be obtained by scanning the white object 604. FIG. 6 respectively shows change processes of an object model, a mesh and an error in the mesh reconstruction process based on the method of the present disclosure. The mesh model is specifically a triangular mesh, and the error is determined according to a distance between closest pair of points on the mesh model surface and the real model surface. The target mesh model 610 corresponding to the transparent object 602 is obtained by reconstructing the initial mesh model 608.

In the embodiment, return to the step of acquiring the target mesh parameter; the mesh model obtained by the reconstructing is meshed according to the acquired target mesh parameter; and the first number of returns is recorded; when the first number of returns reaches the first threshold, stop returning to the step of acquiring the target mesh parameter, so that the mesh model can be repeatedly meshed to implement the optimization and reconstruction processes of the mesh model from sparsity to precision, which effectively improves the accuracy of the target mesh model obtained by reconstruction.

In some embodiments, the step of determining the light ray refraction loss corresponding to the emergent light ray of the image capture device according to the calibration information includes: a first position coordinate corresponding to each of multiple emergent light rays of the image capture device according to the calibration information and the object image, there is a corresponding relationship between the first position coordinate and the emergent light ray; a second position coordinate corresponding to each of the multiple emergent light rays is calculated according to the initial mesh model; the light ray refraction loss corresponding to the initial mesh model is determined according to a coordinate distance between the first position coordinate and the second position coordinate corresponding to each of the multiple emergent light rays.

According to the calibration information corresponding to the image capture device and the captured object images, the terminal can track the multiple emergent light rays emitted by the image capture device, determine the real background position corresponding to each of the multiple emergent light rays emitted by the image capture device, and determine a position coordinate corresponding to the real background position as a first position coordinate. There is a corresponding relationship between the first position coordinate and the emergent light ray. The manner of determining the first position coordinate corresponding to the emergent light ray according to the calibration information and the object image is similar to the manner of determining the real background position in the aforementioned embodiment, so this will not be repeated here.

The terminal can calculate the second position coordinate corresponding to each of the multiple emergent light rays according to the initial mesh model. The second position coordinate refers to a position coordinate of a model background position corresponding to the emergent light ray; and the second position coordinate can be configured to represent a position coordinate of the emergent light ray after being refracted by the initial mesh model. Specifically, the terminal can determine an emergent angle corresponding to each of the multiple emergent light rays, as well as an incoming mesh and an outgoing mesh that intersect the initial mesh model, according to the calibration information corresponding to the image capture device. The terminal can calculate an optical path of the emergent light ray refracted by the initial mesh model according to an angle between the incoming mesh and the emergent light ray as well as an angle between the outgoing mesh and the emergent light ray in the initial mesh model; and determine the second position coordinate corresponding to the emergent light ray according to a distance between the image capture device and the initial mesh model as well as a distance between the image capture device and the background screen. The terminal can calculate a corresponding coordinate distance according to the first position coordinate and the second position coordinate. The calculation manner can specifically be a difference operation. The terminal can determine the light ray refraction loss corresponding to the initial mesh model according to the coordinate distance corresponding to each of the multiple emergent light rays.

Figure 7:
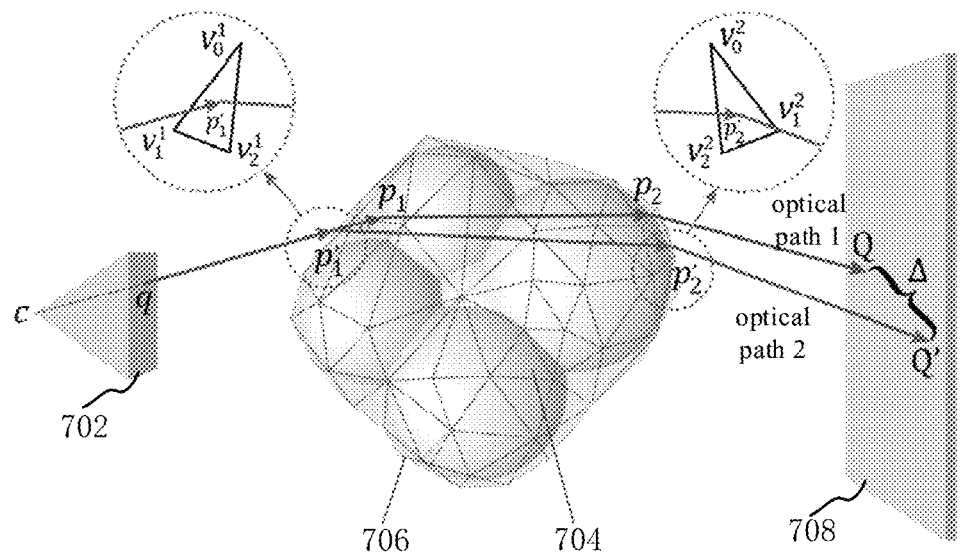
FIG. 7 is a schematic diagram of determining a light ray refraction loss according to one or more embodiments.

For example, FIG. 7 is a schematic diagram of determining a light ray refraction loss in an embodiment. As shown in FIG. 7, the image capture device 702 can emit multiple emergent light rays, and one emergent light ray cq is taken as an example in FIG. 7. The initial mesh model 706 can be generated according to the object images corresponding to the transparent object 704; and the initial mesh model 706 specifically consists of triangular meshes. It can be seen from a partial enlarged view of FIG. 7 that the emergent light ray cq can enter the initial mesh model from a point $p'_1$, and exits the initial mesh model from a point $p'_2$; and the emergent light ray cq is refracted through the incoming meshes $v_0^1 v_1^1 v_2^1$ and the outgoing meshes $v_0^2 v_1^2 v_2^2$ where the points are located, to obtain an optical path 2 corresponding to the emergent light ray, and the second position coordinate Q' is obtained on the background screen 708. In the real process, the emergent light ray can enter the transparent object from the point $p_1$ and exits the transparent object from the point $p_2$ to obtain an optical path 1 corresponding to the emergent light ray and obtain the first position coordinate Q on the background screen. Due to a difference between the initial mesh model and the transparent object, the optical path obtained by refraction also exists a different. The terminal can determine the coordinate distance $\Delta$ according to the first position coordinate Q and the second position coordinate Q', and determine the light ray refraction loss according to the coordinate distance corresponding to each of the multiple emergent light rays, so as to adjust the mesh vertices in the initial mesh model during the mesh reconstruction, such that the target mesh model obtained by the reconstruction can represent the corresponding transparent object more accurately.

In some embodiments, the determination of the light ray refraction loss according to the coordinate distance corresponding to each of the multiple emergent light rays can be specifically represented as:

$$L_{refract} = \sum_{u=1}^{U}\left(\sum_{i\in I}\|Q-Q'\|^2\right)$$

Where $L_{refract}$ represents the light ray refraction loss; u represents a specific capture view angle; and U represents the number of multiple capture view angles; i represents an optical path; and I represents a set of optical paths having two refractions. The terminal can determine a refraction direction of the emergent light ray according to a normal of a mesh and the Fresnel's law. Therefore, the optical path, the first position coordinate Q, and the second position coordinate Q' can be represented by coordinates of the mesh vertices. The gradient of the light ray refraction loss relative to the mesh vertices can be calculated by taking the derivation according to the chain rule.

In the embodiment, the first position coordinate corresponding to each of the multiple emergent light rays is determined, and the second position coordinate corresponding to each of the multiple emergent light rays is calculated according to the initial mesh model, and then the light ray refraction loss corresponding to the initial mesh model is determined according to the coordinate distance between the first position coordinate and the second position coordinate corresponding to each of the multiple emergent light rays, which makes full use of the light ray refraction relationship of the emergent light ray. The light ray refraction loss can accurately reflect the difference between the initial mesh model and the transparent object, so as to reconstruct according to the model loss determined by the light ray refraction loss, thereby effectively improving the accuracy of the mesh reconstruction.

In some embodiments, the above-mentioned method further includes: projective contours of the initial mesh model are acquired at multiple capture view angles; and an object contour loss corresponding to the initial mesh model is determined according to a coincidence degree of a projective contour and a corresponding contour image.

Although the initial mesh model matches the contour image of the transparent object, in the process of reconstructing the mesh model according to the light ray refraction loss, a contour of the reconstructed model may deviate from the true contour. Therefore, the reconstruction of the mesh model can be constrained according to the contour image of the transparent object, thereby effectively improving the accuracy of the mesh reconstruction.

The terminal can acquire the projective contours of the initial mesh model from the multiple capture view angles, in which a capture view angle of a projective contour corresponds to a capture view angle of a contour image. The terminal can acquire the coincidence degree between the projective contour and the contour image at the corresponding capture view angle; and the coincidence degree can be configured to represent the positional relationship between the projective contour and the contour image. The terminal can determine the object contour loss corresponding to the initial mesh model according to the coincidence degree, and adjust the contour position of the initial mesh model in a direction of the gradient descent of the object contour loss.

Specifically, the terminal can acquire a positional relationship between each of multiple contour edges included in the object contour and a corresponding contour image, so as to determine the coincidence degree between the projective contour and the contour image at the corresponding capture view angle. For example, when multiple contour edges included in the object contour are all coincident with the corresponding contour image, it is determined that the projective contour and the contour image have the highest coincidence degree, and the corresponding object contour loss equals to 0.

Figure 8:
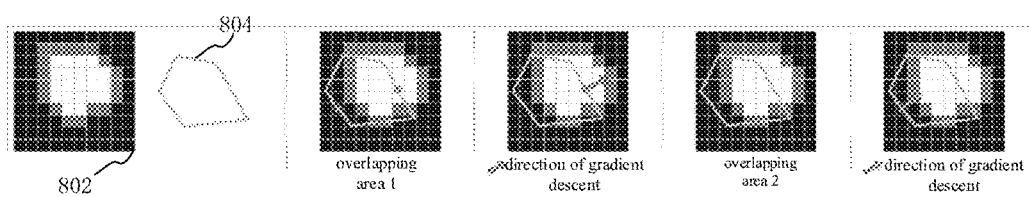
FIG. 8 is a schematic diagram of determining an object contour loss according to one or more embodiments.

As shown in FIG. 8, which is a schematic diagram of determining an object contour loss in an embodiment. In FIG. 8, a projective contour and a contour image at one capture view angle are taken for illustration. The contour image 802 includes image data of multiple pixels, in which white pixels can represent an interior of a transparent object, gray pixels can represent the object contour corresponding to the transparent object, and black pixels can represent an exterior of the transparent object. The initial mesh model has a projective contour 804 at a corresponding capture view angle. An overlapping area 1 shows a midpoint of each of three contour edges in the projective contour 804, and the three midpoints are located in the white pixels, the gray pixels, and the black pixels, respectively. An overlapping area 2 shows that the midpoints of the contour edges in the overlapping area 1 overlap the gray pixels. In the overlapping area 2, the projective contour 804 overlaps the contour image 802, and a midpoint of a contour edge of the projective contour 804 is located in the gray pixels, accordingly the object contour loss can be determined as zero. When the midpoint is not located in the gray pixels, the corresponding mesh model needs to be adjusted in the direction of gradient descent.

In some embodiments, the terminal can acquire contour images and projective contours corresponding to a preset number of capture view angles from a plurality of capture view angles, and determine the object contour loss corresponding to the mesh model. The preset number can be determined according to actual application requirements. For example, the image capture device can acquire object images at seventy-two capture view angles, and the terminal can acquire object images corresponding to five capture view angles from the seventy-two capture view angles, and extract contour images from the object images, and acquire projective contours of the mesh model respectively corresponding to the five capture view angles to determine the object contour loss. The acquisition manner can specifically be random screening. It should be appreciated that the capture view angle can also be randomly selected when determining the light ray refraction loss. For example, one capture view angle can be randomly selected to determine a corresponding light ray refraction loss, and nine capture view angles separated by 40 degrees can be randomly selected to determine the corresponding contour loss. Thus, the amount of data required each time the model loss is determined can be reduced, and the efficiency of the mesh reconstruction is improved while ensuring the accuracy of the mesh reconstruction.

In some embodiments, the determination of the object contour loss can be specifically expressed as:

$$L_{silhouette} = \sum_{u=1}^{U}\sum_{b \in B} |x(s_b)|$$

where, $L_{silhouette}$ represents the object contour loss; b represents a contour edge of a projective contour; B represents a set of contour edges of the projective contour; $s_b$ represents a midpoint corresponding to a contour edge; u represents a specific capture view angle; U represents the number of multiple capture view angles; $x(s_b)$ is an indicator function corresponding to a midpoint, which can be configured to indicate whether the midpoint is on a contour of the contour image. A value of $x(s_b)$ is 0 when the midpoint $s_b$ is on the contour; and the value of $x(s_b)$ is 1 when the midpoint $s_b$ is inside the contour image; and the value of $x(s_b)$ is −1 when the midpoint $s_b$ is outside the contour image.

A negative gradient of the object contour loss $L_{silhouette}$ relative to the midpoint $s_b$ can be expressed as: $x(s_b)\|b\|N_b$ where $\|b\|$ represents a length of a contour edge b; and $N_b$ represents a normal vector of the contour edge b. Assuming that the contour edge b is a projection formed by mesh vertices $v_1^b$ and $v_2^b$, then a midpoint corresponding to the contour edge b can be represented as:

$$s_b = P_u \frac{v_1^b + v_2^b}{2}$$

where, $P_u$ represents a projection matrix corresponding to a capture view angle.

In some embodiments, the terminal can also determine a smooth loss corresponding to the mesh model, and suppress a noisy point generated during the reconstruction of the mesh model according to the smooth loss, so as to measure a difference between normal vectors of adjacent meshes. Specifically, the terminal can acquire normal vectors corresponding to adjacent meshes having a common edge, and perform a dot product operation on the normal vectors, and determine the smooth loss corresponding to the mesh model according to a result of the operation. The smooth loss can be represented as:

$$L_{smooth} = \sum_{e \in E}(-\log(1 + \langle N_1^e, N_2^e \rangle))$$

where e represents a common edge in the mesh model; E represents a set of multiple common edges included in the mesh model; $N_1^e$ and $N_2^e$ can represent normal vectors respectively corresponding to two adjacent meshes; $\langle N_1^e, N_2^e \rangle$ represents a dot product of adjacent normal vectors.

In the embodiment, the projective contours of the initial mesh model at multiple capture view angles are acquired, the object contour loss corresponding to the initial mesh model is determined according to the coincidence degree of the projective contour and the corresponding contour image, so as to determine the model loss of the mesh model according to the object contour loss, which avoids offset of the mesh model in the reconstruction process and effectively improves the accuracy of the mesh reconstruction.

In some embodiments, the above step of determining the model loss corresponding to the initial mesh model according to the light ray refraction loss includes: a light ray refraction weight corresponding to the light ray refraction loss, and a contour weight corresponding to the object contour loss are acquired; the light ray refraction loss and the object contour loss are weighted according to the light ray refraction weight and the contour weight, to obtain the model loss corresponding to the initial mesh model.

The terminal can acquire the light ray refraction weight corresponding to the light ray refraction loss and the contour weight corresponding to the object contour loss. The light ray refraction weight and the contour weight can be determined according to actual application requirements, for example, can be set according to human experiences, or can be determined through a large amount of model reconstruction data, for example, can be obtained through machine learning or data statistics in the reconstruction process.

The terminal can weight the light ray refraction loss and the object contour loss according to the light ray refraction weight and the contour weight to obtain the model loss corresponding to the initial mesh model. Specifically, the terminal can adjust the light ray refraction loss according to the light ray refraction weight to obtain an adjusted light ray refraction loss, and adjust the object contour loss according to the contour weight to obtain an adjusted object contour loss. The adjustment manner can specifically be a product operation. The terminal can perform an operation on the adjusted light ray refraction loss and the adjusted object contour loss, and determine a result of the operation as the model loss corresponding to the initial mesh model. The operation manner can specifically be a summation operation.

In some embodiments, the terminal can also acquire a smooth loss weight corresponding to the smooth loss, adjust the smooth loss according to the smooth loss weight to obtain an adjusted smooth loss, and determine the model loss of the mesh model according to the adjusted smooth loss, the adjusted light ray refraction loss and the adjusted object contour loss. Specifically, the determination of the model loss of the mesh model can be represented as:

$$L = \alpha L_{refract} + \beta L_{silhouette} + \gamma L_{smooth}$$

where L represents the model loss of the mesh model; $\alpha$ represents a light ray refraction weight; $L_{refract}$ represents a light ray refraction loss; $\beta$ represents a contour weight; $L_{silhouette}$ represents an object contour loss; $\gamma$ represents a smooth loss weight; and $L_{smooth}$ represents the smooth loss. The determination manner of the light ray refraction loss, the object contour loss and the smooth loss can be similar to the determination manner in the above-mentioned embodiment, so it will not be repeated here. For example, the light ray refraction weight may specifically be $10^4/HW$, the contour weight may specifically be 0.5/min (H, W), and the smoothing loss weight may specifically be $10^3/s$. Where H represents a pixel width of an object image; W represents a pixel height of an object image; and s represents an average side length of the mesh model.

In the embodiment, the light ray refraction weight and the contour weight are acquired, the light ray refraction loss and the object contour loss are weighted according to the light ray refraction weight and the contour weight to obtain the model loss. Accordingly, the light ray refraction loss and the object contour loss can be effectively synthesized according to the light ray refraction weight and the contour weight, and the accuracy of the obtained model loss is improved, so that the mesh reconstruction can be performed according to the model loss, and the accuracy of the mesh reconstruction of the transparent object is improved.

In some embodiments, the mesh reconstruction method for the transparent object in each embodiment of the present disclosure are tested by using real transparent objects having multiple shapes, and the generated initial mesh model and the reconstructed target mesh model have respective corresponding errors as shown in the following table:

| Shape of transparent object | Error of initial mesh model | Error of target mesh model |
| --- | --- | --- |
| mouse | 0.007164 | 0.003075 |
| dog | 0.004481 | 0.002065 |
| monkey | 0.005048 | 0.002244 |
| hand | 0.005001 | 0.002340 |
| pig | 0.004980 | 0.002696 |
| rabbit | 0.005639 | 0.002848 |
| horse | 0.002032 | 0.001160 |
| tiger | 0.005364 | 0.003020 |

The model error can be determined by an average distance between a pair of points on the model surface and the real model surface. It can be seen from the above table that the error of the target mesh model obtained by reconstructing the mesh model with the model loss is significantly reduced, which effectively improves the accuracy of the target mesh model.

Figure 9:
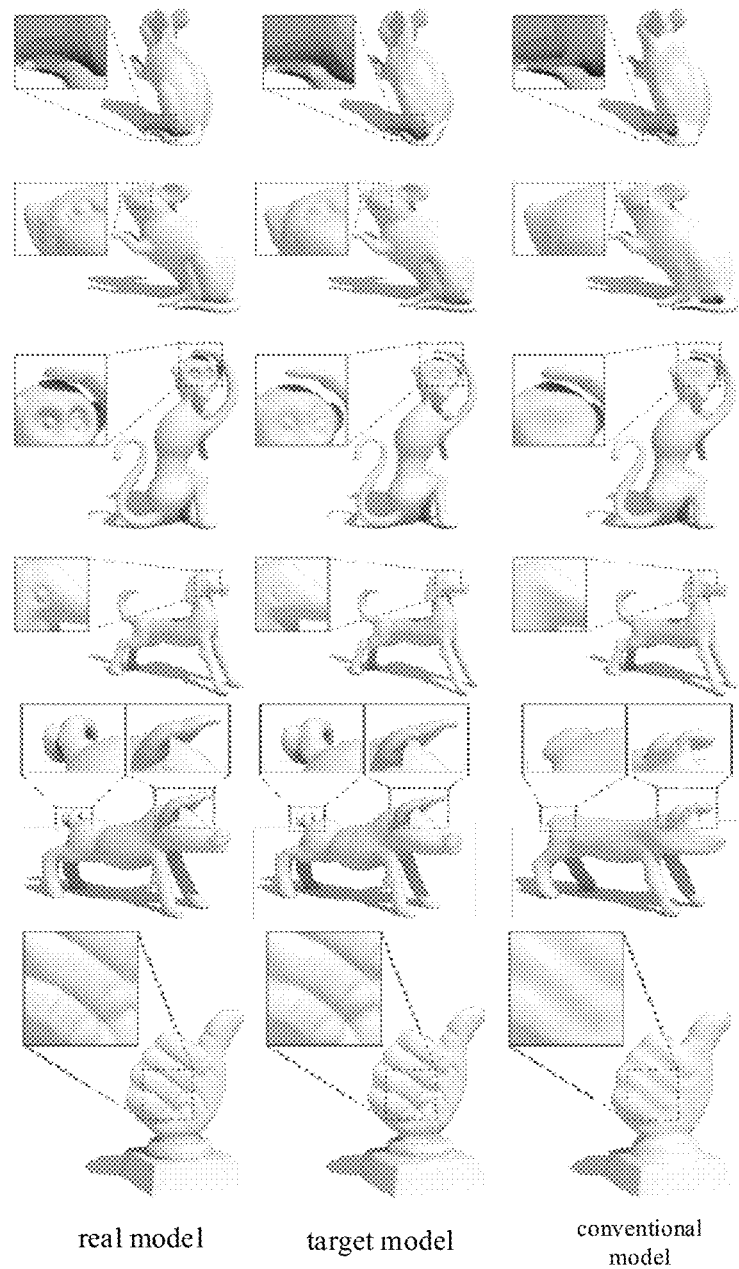
FIG. 9 is a result comparison diagram of a target mesh model according to one or more embodiments.

As shown in FIG. 9, which is a result comparison diagram of a target mesh model in an embodiment. FIG. 9 shows a real model corresponding to a real transparent object, a target model generated by using the mesh reconstruction method of the transparent object in each embodiment of the disclosure, and a conventional model generated by using a conventional manner for a transparent object, and includes a partial enlarged view corresponding to each model. It can be seen from FIG. 9 that the conventional model generated by using the conventional manner is too smooth and thus loses local details of the real model. However, the target model generated in the disclosure has more accurate and obvious details, and can accurately represent a real transparent object, and is closer to the real model of the transparent object, accordingly the accuracy of the mesh reconstruction for the transparent object is efficiently improved.

It should be understood that, although each step in the flow chart of FIG. 2 is displayed in sequence as indicated by the arrows, these steps are not definitely performed in sequence in the order indicated by the arrows. Unless specifically stated in this article, the execution of these steps is not strictly restricted in an order, and these steps can be executed in other orders. Moreover, at least a part of the steps in FIG. 2 can include multiple sub-steps or multiple stages. These sub-steps or stages are not definitely executed at the same time, but can be executed at different moments. The execution of these sub-steps or stages is not definitely performed sequentially, but may be performed in turns or alternately with at least a part of other steps or sub-steps or stages of other steps.

Figure 10:
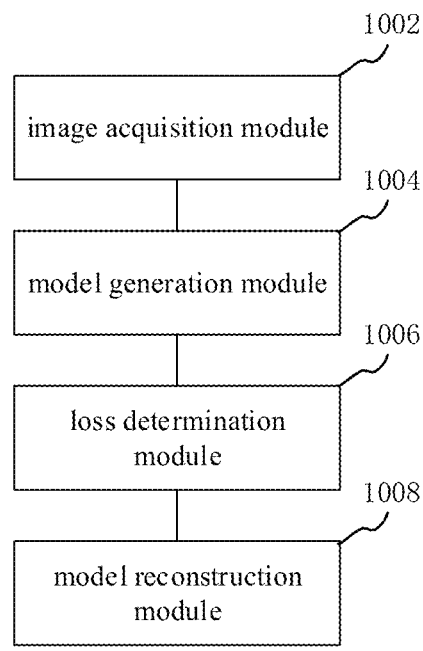
FIG. 10 is a block diagram of a mesh reconstruction apparatus for a transparent object according to one or more embodiments.

In some embodiments, as shown in FIG. 10, a mesh reconstruction apparatus for a transparent object is provided, which includes: an image acquisition module 1002, a model generation module 1004, a loss determination module 1006, and a model reconstruction module 1008.

The image acquisition module 1002 is configured to acquire object images of the transparent object at multiple capture view angles, and calibration information corresponding to an image capture device; the image capture device is configured to acquire the object images.

The model generation module 1004 is configured to generate an initial mesh model corresponding to the transparent object according to the object images acquired at the multiple capture view angles.

The loss determination module 1006 is configured to determine a light ray refraction loss corresponding to an emergent light ray of the image capture device according to the calibration information, and determine a model loss corresponding to the initial mesh model according to the light ray refraction loss.

The mesh reconstruction module 1008 is configured to reconstruct the initial mesh model according to the model loss and obtain a target mesh model corresponding to the transparent object.

In some embodiments, the loss determination module 1006 is further configured to: determine a first position coordinate corresponding to each of multiple emergent light rays of the image capture device according to the calibration information and the object images, there being a corresponding relationship between the first position coordinate and an emergent light ray; calculate a second position coordinate corresponding to each of the multiple emergent light rays according to the initial mesh model; and determine the light ray refraction loss corresponding to the initial mesh model according to a coordinate distance between the first position coordinate and the second position coordinate corresponding to each of the multiple emergent light rays.

In some embodiments, the model generation module 1004 is further configured to: extract a plurality of contour images corresponding to the transparent object from the object images acquired at the multiple capture view angles; perform space carving according to the plurality of contour images to obtain a three-dimensional convex hull corresponding to the transparent object; acquire a target mesh parameter, and mesh the three-dimensional convex hull according to the target mesh parameter to obtain the initial mesh model corresponding to the transparent object.

In some embodiments, the mesh reconstruction module 1008 is further configured to: return to the step of acquiring the target mesh parameter, mesh, according to the acquired target mesh parameter, a mesh model obtained by the reconstructing, and record a first number of returns; and stop returning to the step of acquiring the target mesh parameter when the first number of returns reaches a first threshold.

In some embodiments, the mesh reconstruction module 1008 is further configured to: return to the step of determining the light ray refraction loss corresponding to the emergent light ray of the image capture device according to the calibration information, and record a second number of returns; and stop returning to the step of determining the light ray refraction loss corresponding to the emergent light ray of the image capture device according to the calibration information when the second number of returns reaches a second threshold.

In some embodiments, the loss determination module 1006 is further configured to acquire projection contours of the initial mesh model at the multiple capture view angles, and determine an object contour loss corresponding to the initial mesh model according to a coincidence degree of a projection contour and a corresponding contour image.

In some embodiments, the loss determination module 1006 is further configured to: acquire a light ray refraction weight corresponding to the light ray refraction loss and a contour weight corresponding to the object contour loss, weight the light ray refraction loss and the object contour loss according to the light ray refraction weight and the contour weight, and obtain the model loss corresponding to the initial mesh model.

For the specific limitations of the mesh reconstruction apparatus for a transparent object, reference can be made to the above limitations of the mesh reconstruction method for a transparent object, which will not be repeated here. Each module in the above-mentioned mesh reconstruction apparatus for the transparent object can be implemented in whole or in part by software, hardware, and a combination thereof. The above-mentioned modules can be embedded in the form of hardware or independent of the processor in the computer device, or can be stored in the memory of the computer device in the form of software, so that the processor can call and execute operations corresponding to the above-mentioned modules.

Figure 11:
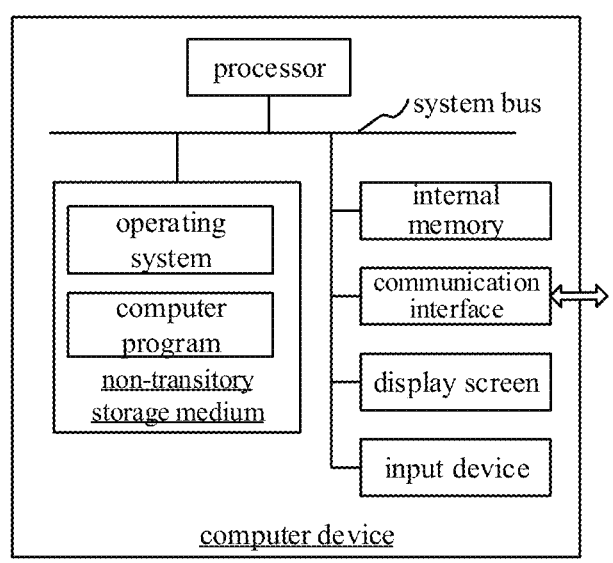
FIG. 11 is a block diagram of a computer device according to one or more embodiments.

In some embodiments, a computer device is provided. The computer device can be a terminal, and an internal structure diagram thereof can be as shown in FIG. 11. The computer device includes a processor, a memory, a communication interface, a display screen and an input device connected through a system bus. The processor of the computer device is configured to provide calculation and control capabilities. The memory of the computer device includes a non-transitory storage medium and an internal memory. The non-transitory storage medium stores an operating system and computer-readable instructions. The internal memory provides an environment for the operation of the operating system and computer-readable instructions in the non-transitory storage medium. The communication interface of the computer device is configured to communicate with an external terminal in a wired or wireless manner. The wireless manner can be implemented through a WIFI, an operator network, a Near Field Communication (NFC) or other technologies. The computer-readable instructions are executed by the processor to implement a mesh reconstruction method for a transparent object. The display screen of the computer device can be a liquid crystal display screen or an electronic ink display screen, and the input device of the computer device can be a touch layer covering the display screen, or a button, trackball or a touch pad provided on a housing of the computer device, or can also be an external keyboard, touchpad, or mouse, etc.

Those skilled in the art can understand that the structure shown in FIG. 11 is merely a block diagram of partial structure related to the solution of the present disclosure, and does not constitute a limitation on the computer device to which the solution of the present disclosure is applied. A specific computer device may include more or fewer parts than shown in the figures, or combine some parts, or having a different arrangement of parts.

A computer device includes one or more processors and a memory storing computer-readable instructions, the one or more processors perform the steps in the above method embodiments when the computer-readable instructions are executed by the one or more processors.

One or more non-transitory computer-readable storage media storing computer-readable instructions, one or more processors perform the steps in the above method embodiments when the computer-readable instructions are executed by one or more processors.

A person of ordinary skill in the art can understand that all or part of the processes in the methods in the above-mentioned embodiments can be completed by instructing relevant a hardware through computer-readable instructions. The computer-readable instructions can be stored in a non-transitory computer-readable storage medium, the computer-readable instructions, when executed, can include the processes of the above-mentioned method embodiments. Any reference to the memory, storage, database or other media used in the embodiments provided by the present disclosure may include a non-transitory and/or a transitory memory. The non-transitory memory may include a read only memory (ROM), a programmable ROM (PROM), an electrically programmable ROM (EPROM), an electrically erasable programmable ROM (EEPROM), or a flash memory. The transitory memory may include a random access memory (RAM) or an external cache memory. As an illustration and not a limitation, RAM is available in many forms, such as a static RAM (SRAM), a dynamic RAM (DRAM), a synchronous DRAM (SDRAM), a double data rate SDRAM (DDRSDRAM), an enhanced SDRAM (ESDRAM), a synchronization link (Synchlink) DRAM (SLDRAM), a memory bus (Rambus) direct RAM (RDRAM), a direct memory bus dynamic RAM (DRDRAM), and a memory bus dynamic RAM (RDRAM), etc.

The technical features of the above embodiments can be combined arbitrarily. In order to make the description concise, all possible combinations of the technical features in the above embodiments are not described. However, as long as there is no contradiction in the combinations of these technical features, these combinations should be considered as the scope of the present disclosure.

The above-mentioned embodiments merely express several implementations of the present disclosure, and the description thereof is relatively specific and detailed, but they should not be understood as a limitation on the scope of the present disclosure. It should be pointed out that those of ordinary skill in the art can make several variations and improvements without departing from the concept of the present disclosure, and these all fall within the protection scope of the present disclosure. Therefore, the scope of protection of the present disclosure shall be subject to the appended claims.

What is claimed is:

1. A mesh reconstruction method for a transparent object, comprising:
    acquiring object images of the transparent object at multiple capture view angles and calibration information corresponding to an image capture device, the image capture device being configured to capture the object images;
    generating an initial mesh model corresponding to the transparent object according to the object images acquired at the multiple capture view angles;
    determining a light ray refraction loss corresponding to an emergent light ray of the image capture device according to the calibration information, and determining a model loss corresponding to the initial mesh model according to the light ray refraction loss; and
    reconstructing the initial mesh model according to the model loss, to obtain a target mesh model corresponding to the transparent object;
    wherein the generating the initial mesh model corresponding to the transparent object according to the object images acquired at the multiple capture view angles comprises:
        extracting a plurality of contour images corresponding to the transparent object from the object images acquired at the multiple capture view angles;
        performing space carving according to the plurality of contour images, to obtain a three-dimensional convex hull corresponding to the transparent object; and
        acquiring a target mesh parameter and meshing the three-dimensional convex hull according to the target mesh parameter, to obtain the initial mesh model corresponding to the transparent object;
    the mesh reconstruction method further comprising:
    acquiring projection contours of the initial mesh model at the multiple capture view angles; and
    determining an object contour loss corresponding to the initial mesh model according to a coincidence degree of a projection contour and a corresponding contour image;
    wherein the determining the model loss corresponding to the initial mesh model according to the light ray refraction loss comprises:
    acquiring a light ray refraction weight corresponding to the light ray refraction loss and a contour weight corresponding to the object contour loss; and
    weighting the light ray refraction loss and the object contour loss according to the light ray refraction weight and the contour weight, to obtain the model loss corresponding to the initial mesh model.

2. The method according to claim 1, wherein the determining the light ray refraction loss corresponding to the emergent light ray of the image capture device according to the calibration information comprises:
    determining a first position coordinate corresponding to each of a plurality of emergent light rays of the image capture device according to the calibration information and the object images, there being a corresponding relationship between the first position coordinate and the emergent light ray;
    calculating a second position coordinate corresponding to each of the plurality of emergent light rays according to the initial mesh model; and
    determining the light ray refraction loss corresponding to the initial mesh model according to a coordinate distance between the first position coordinate and the second position coordinate corresponding to each of the plurality of emergent light rays.

3. The method according to claim 1, further comprising:
    after reconstructing the initial mesh model according to the model loss,
    returning to the step of acquiring the target mesh parameter, meshing, according to the acquired target mesh parameter, a mesh model obtained by the reconstructing, and recording a first number of returns; and
    stopping returning to the step of acquiring the target mesh parameter when the first number of returns reaches a first threshold.

4. The method according to claim 1, further comprising:
    after reconstructing the initial mesh model according to the model loss,
    returning to the step of determining the light ray refraction loss corresponding to the emergent light ray of the image capture device according to the calibration information, and recording a second number of returns; and
    stopping returning to the step of determining the light ray refraction loss corresponding to the emergent light ray of the image capture device according to the calibration information when the second number of returns reaches a second threshold.

5. A computer device comprising one or more processors and a memory storing computer-readable instructions, wherein one or more processors, when executing the computer-readable instructions, perform following steps of:
    acquiring object images of the transparent object at multiple capture view angles and calibration information corresponding to an image capture device, the image capture device being configured to capture the object images;
    generating an initial mesh model corresponding to the transparent object according to the object images acquired at the multiple capture view angles;

determining a light ray refraction loss corresponding to an emergent light ray of the image capture device according to the calibration information, and determining a model loss corresponding to the initial mesh model according to the light ray refraction loss; and reconstructing the initial mesh model according to the model loss, to obtain a target mesh model corresponding to the transparent object;

wherein the one or more processors, when executing the computer-readable instructions, further perform following steps of:

extracting a plurality of contour images corresponding to the transparent object from the object images acquired at the multiple capture view angles;

performing space carving according to the plurality of contour images, to obtain a three-dimensional convex hull corresponding to the transparent object;

acquiring a target mesh parameter and meshing the three-dimensional convex hull according to the target mesh parameter, to obtain an initial mesh model corresponding to the transparent object;

acquiring projection contours of the initial mesh model at the multiple capture view angles;

determining an object contour loss corresponding to the initial mesh model according to a coincidence degree of a projection contour and a corresponding contour image;

acquiring a light ray refraction weight corresponding to the light ray refraction loss and a contour weight corresponding to the object contour loss; and weighting the light ray refraction loss and the object contour loss according to the light ray refraction weight and the contour weight, to obtain the model loss corresponding to the initial mesh model.

6. The computer device according to claim 5, wherein the one or more processors, when executing the computer-readable instructions, further perform following steps of determining a first position coordinate corresponding to each of a plurality of emergent light rays of the image capture device according to the calibration information and the object images, there being a corresponding relationship between the first position coordinate and an emergent light ray;

calculating a second position coordinate corresponding to each of the plurality of emergent light rays according to the initial mesh model; and determining the light ray refraction loss corresponding to the initial mesh model according to a coordinate distance between the first position coordinate and the second position coordinate corresponding to each of the plurality of emergent light rays.

7. The computer device according to claim 5, wherein the one or more processors, when executing the computer-readable instructions, further perform following steps of:

returning to the step of acquiring the target mesh parameter, meshing, according to the acquired target mesh parameter, a mesh model obtained by the reconstructing, and recording a first number of returns; and stopping returning to the step of acquiring the target mesh parameter when the first number of returns reaches a first threshold.

8. One or more non-transitory computer-readable storage media storing computer-readable instructions, wherein one or more processors, when executing the computer-readable instructions, perform following steps of:

acquiring object images of the transparent object at multiple capture view angles and calibration information corresponding to an image capture device, the image capture device being configured to capture the object images;

generating an initial mesh model corresponding to the transparent object according to the object images acquired at the multiple capture view angles;

determining a light ray refraction loss corresponding to an emergent light ray of the image capture device according to the calibration information, and determining a model loss corresponding to the initial mesh model according to the light ray refraction loss; and reconstructing the initial mesh model according to the model loss, to obtain a target mesh model corresponding to the transparent object;

wherein the one or more processors, when executing the computer-readable instructions, further perform following steps of:

extracting a plurality of contour images corresponding to the transparent object from the object images acquired at the multiple capture view angles;

performing space carving according to the plurality of contour images, to obtain a three-dimensional convex hull corresponding to the transparent object;

acquiring a target mesh parameter and meshing the three-dimensional convex hull according to the target mesh parameter, to obtain the initial mesh model corresponding to the transparent object;

acquiring projection contours of the initial mesh model at the multiple capture view angles;

determining an object contour loss corresponding to the initial mesh model according to a coincidence degree of a projection contour and a corresponding contour image;

acquiring a light ray refraction weight corresponding to the light ray refraction loss and a contour weight corresponding to the object contour loss; and weighting the light ray refraction loss and the object contour loss according to the light ray refraction weight and the contour weight, to obtain the model loss corresponding to the initial mesh model.

9. The storage medium according to claim 8, wherein the one or more processors, when executing the computer-readable instructions, perform following steps of:

determining a first position coordinate corresponding to each of a plurality of emergent light rays of the image capture device according to the calibration information and the object images, there being a corresponding relationship between the first position coordinate and an emergent light ray;

calculating a second position coordinate corresponding to each of the plurality of emergent light rays according to the initial mesh model; and determining a light ray refraction loss corresponding to the initial mesh model according to a coordinate distance between the first position coordinate and the second position coordinate corresponding to each of the plurality of emergent light rays.

10. The storage medium according to claim 8, wherein the one or more processors, when executing the computer-readable instructions, perform following steps of:

returning to the step of acquiring the target mesh parameter, meshing, according to the acquired target mesh parameter, a mesh model obtained by the reconstructing, and recording a first number of returns; and stopping returning to the step of acquiring the target mesh parameter when the first number of returns reaches a first threshold.

* * * * *